US008872490B2

(12) United States Patent
Yoshikawa et al.

(10) Patent No.: US 8,872,490 B2
(45) Date of Patent: Oct. 28, 2014

(54) VOLTAGE REGULATOR

(71) Applicant: Seiko Instruments Inc., Chiba (JP)

(72) Inventors: Kiyoshi Yoshikawa, Chiba (JP); Osamu Uehara, Chiba (JP)

(73) Assignee: Seiko Instruments Inc., Chiba (JP)

( * ) Notice: Subject to any disclaimer, the term of this patent is extended or adjusted under 35 U.S.C. 154(b) by 117 days.

(21) Appl. No.: 13/784,104

(22) Filed: Mar. 4, 2013

(65) Prior Publication Data

US 2013/0249510 A1    Sep. 26, 2013

(30) Foreign Application Priority Data

Mar. 21, 2012  (JP) ................................ 2012-064277

(51) Int. Cl.
*G05F 1/46* (2006.01)
*G05F 1/569* (2006.01)

(52) U.S. Cl.
CPC ............ *G06F 1/573* (2013.01); *Y10S 323/901* (2013.01); *Y10S 323/908* (2013.01)
USPC ............................ 323/273; 323/901; 323/908

(58) Field of Classification Search
USPC ................... 323/273, 349, 901, 908
See application file for complete search history.

(56) References Cited

U.S. PATENT DOCUMENTS

| 6,525,517 | B1 * | 2/2003 | Hojo et al. ................... 323/316 |
| 8,450,986 | B2 * | 5/2013 | Imura et al. .................. 323/277 |
| 2007/0120544 | A1 * | 5/2007 | Ritter ............................. 323/281 |
| 2012/0126762 | A1 * | 5/2012 | Takano et al. ................. 323/274 |

FOREIGN PATENT DOCUMENTS

JP    2011-239130 A    11/2011

* cited by examiner

*Primary Examiner* — Gary L Laxton
(74) *Attorney, Agent, or Firm* — Brinks Gilson & Lione

(57) ABSTRACT

Provided is a voltage regulator which includes an inrush current prevention circuit so that no current is consumed after the start-up of the voltage regulator. A start-up circuit of the voltage regulator includes: a constant current circuit; a first transistor connected between the constant current circuit and a constant voltage generation circuit; a second transistor including a drain connected to a gate of the first transistor, and a gate to which a voltage based on an output voltage is input; a first depletion transistor including a gate connected to the drain of the second transistor, and a source connected to a source of the second transistor; and a third transistor including a gate connected to the gate of the second transistor, and a drain connected to the drain of the second transistor.

6 Claims, 3 Drawing Sheets

US 8,872,490 B2

VOLTAGE REGULATOR

RELATED APPLICATIONS

This application claims priority under 35 U.S.C. §119 to Japanese Patent Application No. 2012-064277 filed on Mar. 21, 2012, the entire content of which is hereby incorporated by reference.

BACKGROUND OF THE INVENTION

1. Field of the Invention

The present invention relates to an inrush current prevention circuit in a voltage regulator.

2. Description of the Related Art

Now, a conventional voltage regulator is described. FIG. 3 is a circuit diagram illustrating the conventional voltage regulator.

The conventional voltage regulator includes a bias circuit 105, an amplifier 106, N-channel depletion transistors 121, 122, 124, and 125, a PMOS transistor 111, NMOS transistors 123, 126, 127, and 128, resistors 109 and 110, a capacitor 108, inverters 107, 131, and 132, a ground terminal 100, an output terminal 103, a power supply terminal 101, an external terminal 104, and a chip enable terminal 102.

When a control signal input to the chip enable terminal 102 changes from Lo to Hi, the amplifier 106 operates with a current flowing from the bias circuit 105. On the other hand, the NMOS transistor 123 also becomes the ON state because the control signal is Hi. Accordingly, a current I1 flows via the N-channel depletion transistor 122, the NMOS transistor 123, and the external terminal 104, and then the capacitor 108 is charged. When the voltage of the external terminal 104 increases to some extent, the N-channel depletion transistor 125 and the NMOS transistor 126 start to operate and output a reference voltage Vref. Before the rise of the reference voltage Vref, the output of the amplifier 106 is Hi and the PMOS transistor 111 is maintained in the OFF state. Upon the rise of the reference voltage Vref, the output of the amplifier 106 decreases to maintain the PMOS transistor 111 in the ON state, and a voltage Vout of the output terminal 103 starts to rise. When the output voltage Vout increases to some extent, a current I2 starts to flow from the N-channel depletion transistor 124 to the N-channel depletion transistor 125 and the NMOS transistor 126. Then, a voltage VFB divided by the resistors 109 and 110 also increases to maintain the NMOS transistor 127 in the ON state, and the gate voltage of the NMOS transistor 123 decreases to the voltage of the ground terminal 100. Then, the NMOS transistor 123 is turned OFF, and the current I1 flowing to the external terminal 104 abruptly decreases.

On the other hand, the current I2 flowing to the external terminal 104 via the N-channel depletion transistor 124 increases after a while because the current I2 is consumed for charging the capacitor 108. However, the current I2 decreases as the capacitor 108 becomes closer to the fully charged state. When the capacitor 108 is completely charged and the output voltage Vout has completely risen, only a current I3 flows to the N-channel depletion transistor 125 and the NMOS transistor 126. Therefore, even when the capacitor 108 is added, current consumption in the steady state is not increased.

In this way, even when the control signal of the chip enable terminal 102 abruptly rises, the output voltage Vout gradually rises, and, even when a large smoothing capacitor is connected to the output terminal 103, an inrush current flowing to the output terminal 103 can be suppressed (see, for example, Japanese Patent Application Laid-open No. 2011-239130).

SUMMARY OF THE INVENTION

The present invention provides a voltage regulator which includes an inrush current prevention circuit so that no current is consumed after the start-up of the voltage regulator and which therefore has smaller current consumption than a conventional one.

According to an exemplary embodiment of the present invention, there is provided a voltage regulator, including: a constant voltage generation circuit for generating a reference voltage; an amplifier for amplifying and outputting a difference between the reference voltage and a divided voltage obtained by dividing an output voltage output from an output transistor, and controlling a gate of the output transistor; an external terminal for inputting a signal for turning ON and OFF a circuit from outside; and a start-up circuit for starting the constant voltage generation circuit, the start-up circuit including: a constant current circuit; a first transistor connected between the constant current circuit and the constant voltage generation circuit; a second transistor including a drain connected to a gate of the first transistor, and a gate to which a voltage based on the output voltage is input; a first depletion transistor including a gate connected to the drain of the second transistor, and a source connected to a source of the second transistor; and a third transistor including a gate connected to the gate of the second transistor, and a drain connected to the drain of the second transistor.

According to the voltage regulator including the inrush current prevention circuit of the present invention, the output voltage is gradually raised so as to suppress an inrush current, and, after the output voltage has risen, a current is prevented from flowing from an inverter or a chip enable terminal. Current consumption of the voltage regulator can therefore be reduced.

DETAILED DESCRIPTION OF THE PREFERRED EMBODIMENTS

Referring to the accompanying drawings, embodiments of the present invention are described below.

First Embodiment

Figure 1:
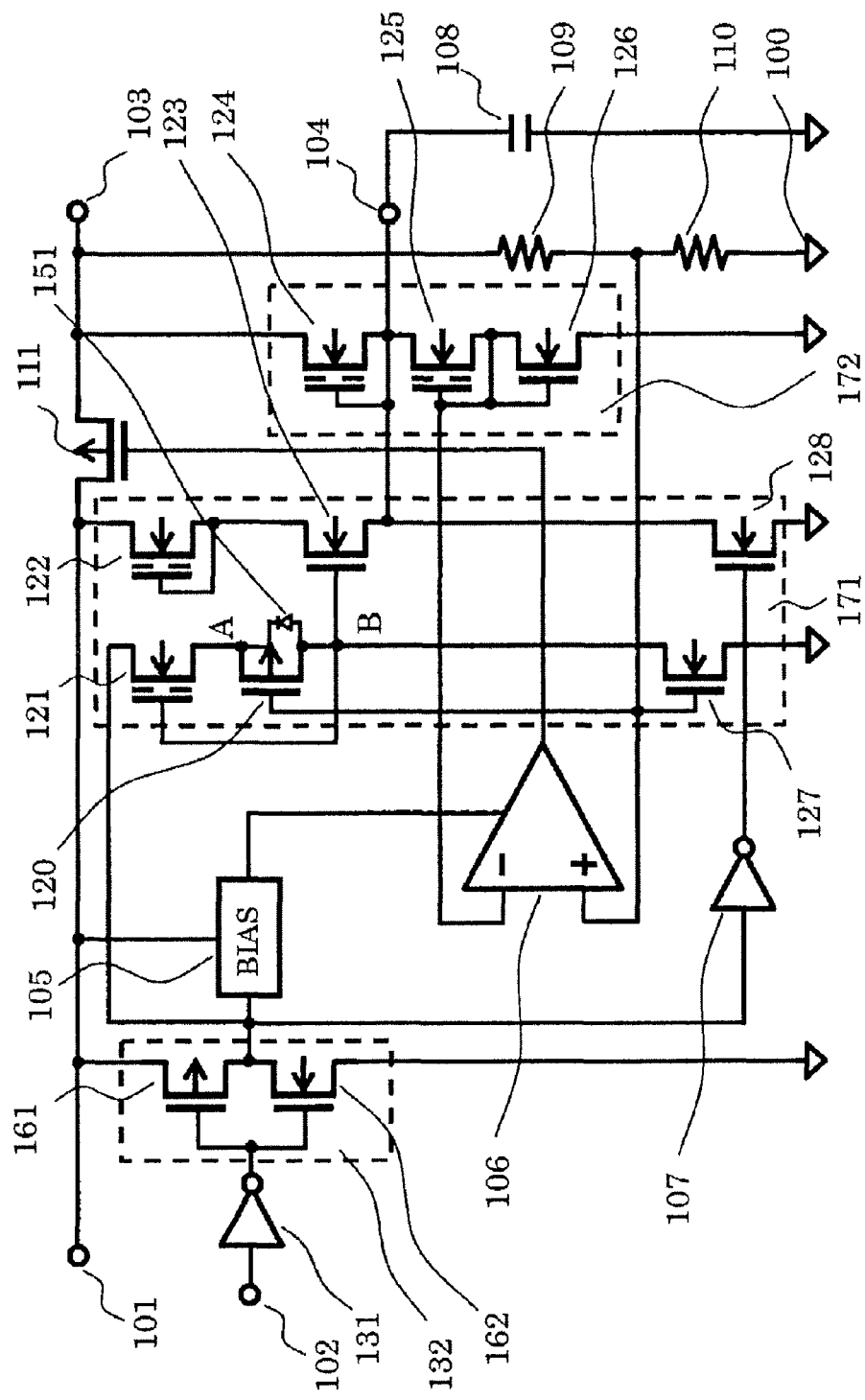
FIG. 1 is a circuit diagram illustrating a voltage regulator according to a first embodiment of the present invention.

FIG. 1 is a circuit diagram of a voltage regulator according to a first embodiment of the present invention.

The voltage regulator according to the first embodiment includes a bias circuit 105, an amplifier 106, N-channel depletion transistors 121, 122, 124, and 125, PMOS transistors 111 and 120, NMOS transistors 123, 126, 127, and 128, resistors 109 and 110, a capacitor 108, inverters 107, 131, and 132, a ground terminal 100, an output terminal 103, a power supply terminal 101, an external terminal 104, and a chip enable terminal 102. The inverter 132 includes an NMOS transistor 162 and a PMOS transistor 161. The NMOS transistors 123, 127, and 128, the PMOS transistor 120, and the N-channel depletion transistors 121 and 122 together form a start-up circuit 171. The NMOS transistor 126 and the N-channel depletion transistors 124 and 125 together form a constant voltage circuit 172.

Next, connections in the voltage regulator according to the first embodiment are described. The PMOS transistor 161 has a gate connected to a gate of the NMOS transistor 162, a drain connected to a drain of the NMOS transistor 162, and a source connected to the power supply terminal 101. The NMOS transistor 162 has a source connected to the ground terminal 100, a gate serving as an input of the inverter 132, and a drain serving as an output of the inverter 132. The inverter 131 has an input connected to the chip enable terminal 102 and an output connected to the input of the inverter 132. The bias circuit 105 has an input connected to the output of the inverter 132, a drain of the N-channel depletion transistor 121, and an input of the inverter 107. The bias circuit 105 has an output connected to the amplifier 106 and a power supply terminal connected to the power supply terminal 101. The N-channel depletion transistor 121 has a gate connected to a drain of the PMOS transistor 120 and a source connected to a source and a back gate of the PMOS transistor 120. The NMOS transistor 127 has a gate connected to a gate of the PMOS transistor 120 and a connection point between the resistor 109 and the resistor 110. The NMOS transistor 127 has a drain connected to a drain of the PMOS transistor 120 and a source connected to the ground terminal 100. The resistor 109 is connected between the connection point between the resistor 109 and the resistor 110 and the output terminal 103. The resistor 110 is connected between the connection point between the resistor 109 and the resistor 110 and the ground terminal 100. The amplifier 106 has an inverting input terminal connected to a gate and a source of the N-channel depletion transistor 125 and a gate and a drain of the NMOS transistor 126, a non-inverting input terminal connected to the connection point between the resistor 109 and the resistor 110, and an output connected to a gate of the PMOS transistor 111. The PMOS transistor 111 has a source connected to the power supply terminal 101 and a drain connected to the output terminal 103. The N-channel depletion transistor 122 has a gate and a source connected to a drain of the NMOS transistor 123, and has a drain connected to the power supply terminal 101. The NMOS transistor 123 has a gate connected to a drain of the PMOS transistor 120 and a source connected to a drain of the N-channel depletion transistor 125. The NMOS transistor 128 has a gate connected to an output of the inverter 107, a drain connected to a source of the NMOS transistor 123, and a source connected to the ground terminal 100. The N-channel depletion transistor 124 has a gate and a source connected to a drain of the N-channel depletion transistor 125 and the external terminal 104, and has a drain connected to the output terminal 103. The NMOS transistor 126 has a source connected to the ground terminal 100. The capacitor 108 is connected between the external terminal 104 and the ground terminal 100.

Next, the operation of the voltage regulator according to the first embodiment is described. When a control signal input to the chip enable terminal 102 changes from Lo to Hi, the inverter 131 outputs Lo and the inverter 132 outputs Hi, and the bias circuit 105 starts its operation. The amplifier 106 operates with a current flowing from the bias circuit 105. The inverter 107 outputs Lo in response to the output of the inverter 132, thereby turning OFF the NMOS transistor 128. A voltage divided by the resistors 109 and 110 is represented by VFB. The divided voltage VFB which is output when the control signal changes from Lo to Hi is the same voltage as that of the ground terminal 100, and hence the PMOS transistor 120 is turned ON. A threshold of the N-channel depletion transistor 121 is represented by Vtnd, a threshold of the PMOS transistor 120 is represented by Vtp, a connection point between the N-channel depletion transistor 121 and the PMOS transistor 120 is represented by node A, and a connection point between the drain of the PMOS transistor 120 and the gate of the NMOS transistor 123 is represented by node B. The thresholds Vtnd and Vtp are adjusted so as to satisfy the following relationships.

$$|Vtnd| > |Vtp| \qquad \text{Ex. 1}$$

$$|Vtnd| < |Vtp| + VFB2 \qquad \text{Ex. 2}$$

where VFB2 represents the divided voltage VFB after the rise of VOUT. The divided voltage VFB before the rise of VOUT is 0 V, and hence the voltage at the node A is |Vtp| and the NMOS transistor 127 is turned OFF. Thus, the node B has a voltage of 0 V or more. A gate-source voltage Vgs121 of the N-channel depletion transistor 121 is a difference voltage between the voltage at the node B and the voltage at the node A. Thus, Expression 3 is established.

$$Vgs121 = (\text{voltage at node } B) - |Vtp| \qquad \text{Ex. 3}$$

The N-channel depletion transistor 121 can be turned ON under the condition of Expression 4.

$$Vgs121 > -|Vtnd| \qquad \text{Ex. 4}$$

Expression 3 is substituted into Expression 4 to derive Expression 5.

$$|Vtnd| > |Vtp| - (\text{voltage at node } B) \qquad \text{Ex. 5}$$

In this case, Vtnd and Vtp are adjusted as expressed by Expression 1, and hence, if the voltage at the node B is 0 V or more, the condition of turning ON the N-channel depletion transistor 121 is satisfied. Then, a current flows via the N-channel depletion transistor 121 and the PMOS transistor 120, thereby increasing the voltage at the node B. With the increase in voltage at the node B, the NMOS transistor 123 is turned ON.

The N-channel depletion transistor 122 causes a current I1 to flow, and the current I1 charges the capacitor 108 via the NMOS transistor 123 and the external terminal 104. When the voltage of the external terminal 104 increases to some extent, the N-channel depletion transistor 125 and the NMOS transistor 126 start to operate and output a reference voltage Vref. Before the rise of the reference voltage Vref, the output of the amplifier 106 is Hi and the PMOS transistor 111 is maintained in the OFF state. Upon the rise of the reference voltage Vref, the output of the amplifier 106 decreases to maintain the PMOS transistor 111 in the ON state, and the voltage Vout of the output terminal 103 starts to rise. When the output voltage Vout increases to some extent, a current I2 starts to flow gradually from the N-channel depletion transistor 124. Then, the voltage VFB divided by the resistors 109 and 110 also increases to maintain the NMOS transistor 127 in the ON state, and the gate voltage of the NMOS transistor 123 decreases to the voltage of the ground terminal 100. Then, the NMOS transistor 123 is turned OFF, and the current I1 flowing to the external terminal 104 abruptly decreases.

On the other hand, the current I2 flowing to the external terminal 104 via the N-channel depletion transistor 124 increases after a while because the current I2 is consumed for charging the capacitor 108. However, the current I2 decreases as the capacitor 108 becomes closer to the fully charged state. When the capacitor 108 is completely charged and the output voltage Vout has completely risen, only a current I3 flows to the N-channel depletion transistor 125 and the NMOS transistor 126. Therefore, even when the capacitor 108 is added, current consumption in the steady state is not increased. In this way, even when the control signal of the chip enable terminal 102 abruptly rises, the output voltage Vout gradually rises, and, even when a large smoothing capacitor is connected to the output terminal 103, an inrush current flowing to the output terminal 103 can be suppressed.

The divided voltage VFB after the rise of VOUT is represented by VFB2 as described above, and hence the voltage at the node A is VFB2+|Vtp|. The NMOS transistor 127 is ON, and hence the voltage at the node B is 0 V. The gate-source voltage Vgs121 of the N-channel depletion transistor 121 is a difference voltage between the voltage at the node B and the voltage at the node A, and hence Expression 6 is established.

$$Vgs121=0-(VFB2+|Vtp|) \quad \text{Ex. 6}$$

The N-channel depletion transistor 121 can be turned ON under the condition expressed by Expression 4. Expression 6 is substituted into Expression 4 to derive Expression 7.

$$|Vtnd|>|Vtp|+VFB2+0 \quad \text{Ex. 7}$$

In this case, Vtnd and Vtp are adjusted as expressed by Expression 2, and hence the condition of turning ON the N-channel depletion transistor 121 is not satisfied. Then, the N-channel depletion transistor 121 is turned OFF, and no current flows. In this way, after the rise of the output voltage, a current can be prevented from flowing from the PMOS transistor 161 of the inverter 132 via the N-channel depletion transistor 121.

In the PMOS transistor 120, the back gate and the source are connected to each other, and hence a parasitic diode 151 is generated. When the control signal input to the chip enable terminal 102 changes from Hi to Lo, the charges at the node B are discharged via the parasitic diode 151 of the PMOS transistor 120, the N-channel depletion transistor 121, and the NMOS transistor 162 forming the inverter 132. In this way, the voltage at the node B becomes 0 V, and, even when the control signal changes from Lo to Hi thereafter, the normal operation can be performed.

Note that, the case where the inverters 131 and 132 are connected in series to the chip enable terminal 102 has been described above, but, even in the a case where the inverters 131 and 132 are not provided and a signal is input directly from an external device, a current can be prevented from flowing from the external device, and hence current consumption of the external device can be reduced. Although the N-channel depletion transistor 122 is used for causing a current to flow to the external terminal 104, the same operation can be achieved even by using a resistor or a constant current circuit having another configuration. Further, even when the back gate of the PMOS transistor 120 is connected to the drain of the N-channel depletion transistor 121, the parasitic diode 151 can be similarly generated to achieve the same operation.

In this way, the output voltage Vout is gradually raised so as to suppress an inrush current, and, after the output voltage Vout has risen, a current can be prevented from flowing from the inverter 132 or the chip enable terminal 102 via the N-channel depletion transistor 121 and the NMOS transistor 127.

Second Embodiment

Figure 2:
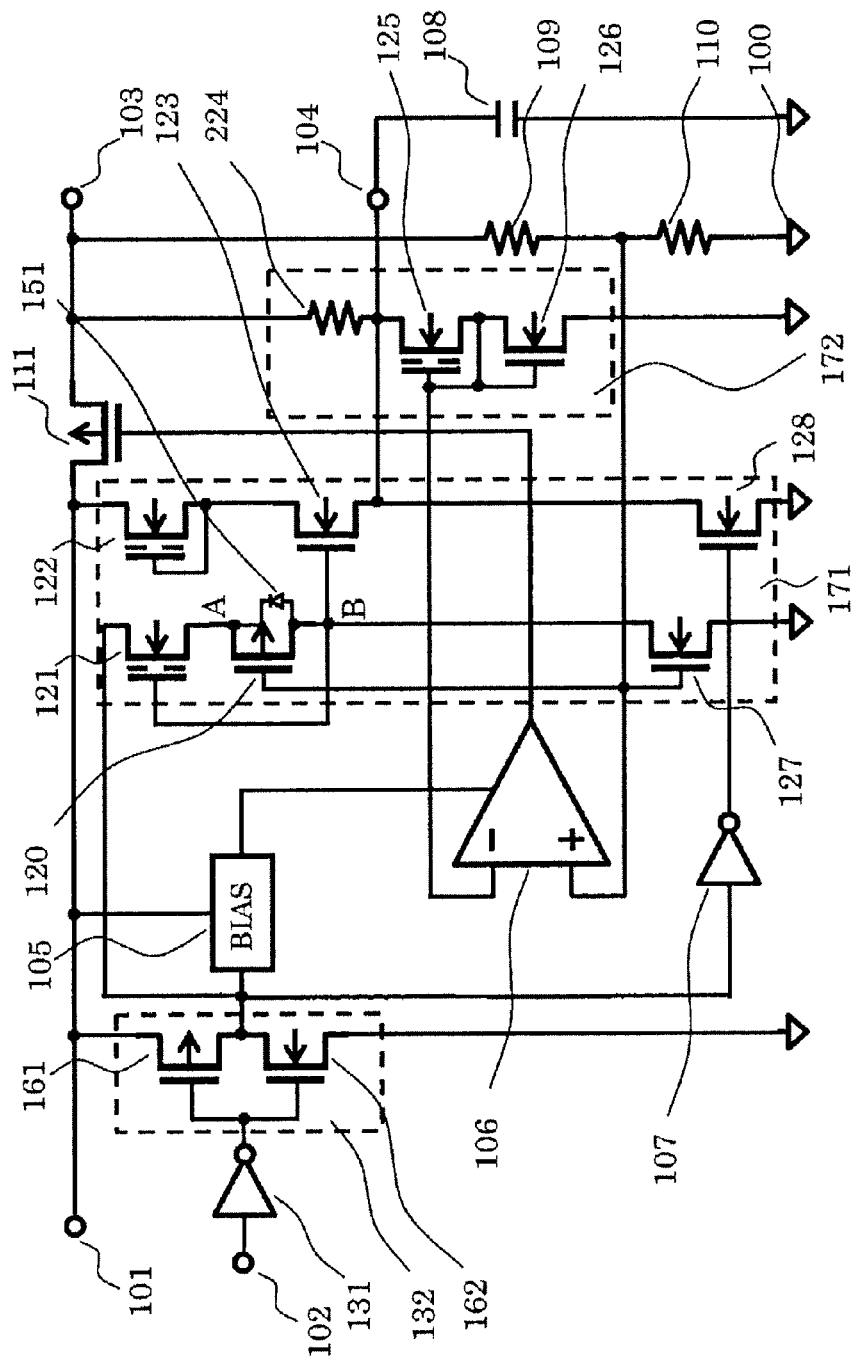
FIG. 2 is a circuit diagram illustrating a voltage regulator according to a second embodiment of the present invention.
Figure 3:
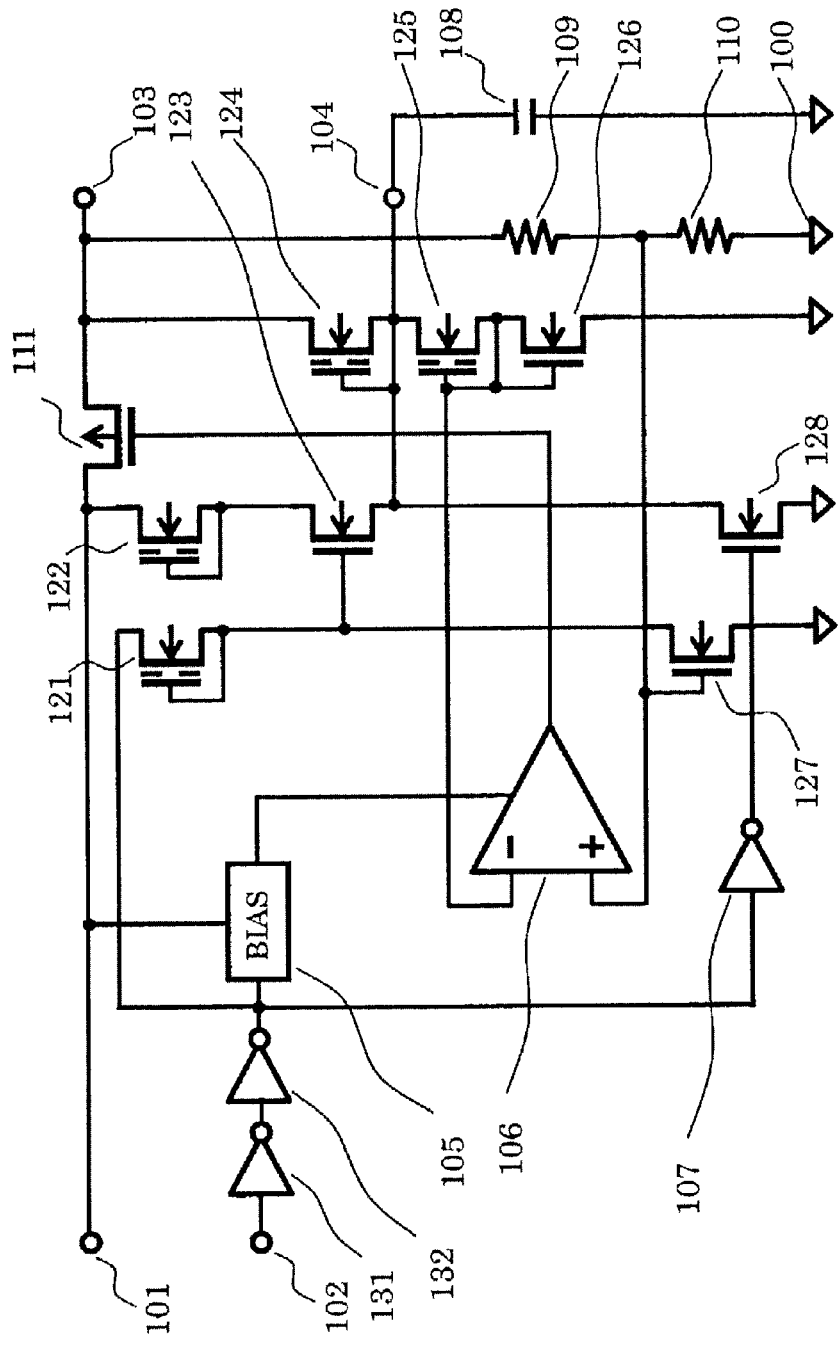
FIG. 3 is a circuit diagram illustrating a conventional voltage regulator.

FIG. 2 is a circuit diagram of a voltage regulator according to a second embodiment of the present invention. FIG. 2 is different from FIG. 1 in that the N-channel depletion transistor 124 is replaced by a resistor 224. The resistor 224 is used for causing a current to flow to the N-channel depletion transistor 125 and the NMOS transistor 126. Also with this configuration, the output voltage Vout is gradually raised so as to suppress an inrush current, and, after the output voltage Vout has risen, a current can be prevented from flowing from the inverter 132 or the chip enable terminal 102 via the N-channel depletion transistor 121 and the NMOS transistor 127.

What is claimed is:

1. A voltage regulator, comprising:
    a constant voltage generation circuit for generating a reference voltage;
    an amplifier for amplifying and outputting a difference between the reference voltage and a divided voltage obtained by dividing an output voltage output from an output transistor, and controlling a gate of the output transistor;
    an external terminal for inputting a signal for turning ON and OFF a circuit from outside; and
    a start-up circuit for starting the constant voltage generation circuit,
    the start-up circuit comprising:
        a constant current circuit;
        a first transistor connected between the constant current circuit and the constant voltage generation circuit;
        a second transistor including a drain connected to a gate of the first transistor, and a gate to which a voltage based on the output voltage is input;
        a first depletion transistor including a gate connected to the drain of the second transistor, and a source connected to a source of the second transistor; and
        a third transistor including a gate connected to the gate of the second transistor, and a drain connected to the drain of the second transistor.

2. A voltage regulator according to claim 1, wherein the second transistor includes a back gate connected to one of a drain of the first depletion transistor and the source of the second transistor.

3. A voltage regulator according to claim 1, wherein the constant current circuit further comprises a second depletion transistor including a gate and a source which are connected to each other.

4. A voltage regulator according to claim 2, wherein the constant current circuit further comprises a second depletion transistor including a gate and a source which are connected to each other.

5. A voltage regulator according to claim 1, wherein the constant voltage generation circuit comprises:
    a third depletion transistor including a gate and a source which are connected to each other;
    a fourth depletion transistor including a gate and a source which are connected to each other, and a drain connected to the source of the third depletion transistor; and
    a fourth transistor including a gate and a drain which are connected to the gate and the source of the fourth depletion transistor.

6. A voltage regulator according to claim 1, wherein the constant voltage generation circuit comprises:
    a resistor;
    a fourth depletion transistor including a gate and a source which are connected to each other, and a drain connected to the resistor; and
    a fourth transistor including a gate and a drain which are connected to the gate and the source of the fourth depletion transistor.

* * * * *